United States Patent
Huang

(12) United States Patent     (10) Patent No.: US 9,952,058 B2
Huang     (45) Date of Patent: Apr. 24, 2018

(54) DRIVER VISIBILITY DETECTION SYSTEM AND METHOD FOR DETECTING DRIVER VISIBILITY

(71) Applicant: DENSO International America, Inc., Southfield, MI (US)

(72) Inventor: Minglei Huang, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/249,858

(22) Filed: Aug. 29, 2016

(65) Prior Publication Data
US 2018/0058873 A1     Mar. 1, 2018

(51) Int. Cl.
| | |
|---|---|
| *B60Q 1/00* | (2006.01) |
| *G01C 21/36* | (2006.01) |
| *G01S 17/93* | (2006.01) |
| *G01S 19/13* | (2010.01) |
| *G01S 17/02* | (2006.01) |
| *B60Q 1/34* | (2006.01) |
| *G06K 9/00* | (2006.01) |

(52) U.S. Cl.
CPC ............ *G01C 21/365* (2013.01); *B60Q 1/346* (2013.01); *G01S 17/023* (2013.01); *G01S 17/936* (2013.01); *G01S 19/13* (2013.01); *G06K 9/00805* (2013.01); *G06K 9/00832* (2013.01)

(58) Field of Classification Search
CPC ............ G01C 21/365; G06K 9/00805; G06K 9/00832; B60Q 1/346; G01S 19/13; G01S 17/936; G01S 17/023

USPC ..... 340/439, 435, 436, 905, 425.5; 382/156; 356/342, 437
See application file for complete search history.

(56) References Cited

U.S. PATENT DOCUMENTS

| | | | |
|---|---|---|---|
| 5,987,152 A | 11/1999 | Weisser | |
| 8,085,140 B2 * | 12/2011 | Mochizuki | ............ B60W 40/02 340/435 |
| 8,634,980 B1 | 1/2014 | Urmson et al. | |
| 8,977,489 B2 * | 3/2015 | Szczerba | ............ G01C 21/365 345/7 |
| 2011/0301813 A1 | 12/2011 | Sun et al. | |
| 2015/0232030 A1 * | 8/2015 | Bongwald | ................. B60R 1/00 348/115 |
| 2015/0310313 A1 * | 10/2015 | Murayama | ......... G01C 21/3602 382/104 |

FOREIGN PATENT DOCUMENTS

EP    19950108569 A1    1/1996

* cited by examiner

*Primary Examiner* — Anh V La

(57) ABSTRACT

A driver visibility detection system for a vehicle includes an indicator, an eye position obtainer, and a visible range calculator. The indicator indicates the driver to look at, through a windshield of the vehicle, a furthest ground position of a road on which the vehicle is traveling. The eye position obtainer recognizes an eye position of the driver when the driver looks at the furthest ground position. The visible range calculator calculates a visible range of the driver based on the eye position detected by the eye position obtainer.

24 Claims, 3 Drawing Sheets

DRIVER VISIBILITY DETECTION SYSTEM AND METHOD FOR DETECTING DRIVER VISIBILITY

TECHNICAL FIELD

The present disclosure relates to a driver visibility detection system and a method for detecting driver visibility.

BACKGROUND

Generally, human visual perception is adversely affected during driving in certain weather conditions such as a foggy condition, a smoky condition, a raining or snowing condition, or the like. Even during such a low visibility weather condition, drivers sometimes overestimate own perception, which may lead to dangerous situations.

Therefore, there has been a demand to accurately calculate the visible range of a driver during low visibility weather conditions.

It is an objective to provide a driver visibility detection system that accurately calculates a visible range of a driver. It is another objective to provide a method for detecting driver visibility, which accurately calculates a visible range of a driver.

SUMMARY

This section provides a general summary of the disclosure, and is not a comprehensive disclosure of its full scope or all of its features.

In a first aspect of the present disclosure, a driver visibility detection system for a vehicle includes an indicator, an eye position obtainer, and a visible range calculator. The indicator indicates the driver to look at, through a windshield of the vehicle, a furthest ground position of a road on which the vehicle is traveling. The eye position obtainer recognizes an eye position of the driver when the driver looks at the furthest ground position. The visible range calculator calculates a visible range of the driver based on the eye position detected by the eye position obtainer.

In a second aspect of the present disclosure, a method for detecting driver visibility including the step of indicating a driver to look at, through a windshield of a vehicle, a furthest ground position of a road on which the vehicle is traveling. The method also includes the step of obtaining an eye position of the driver when the driver looks at the furthest ground position, and calculating a visible range of the driver based on the eye position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

DETAILED DESCRIPTION

Figure 1:
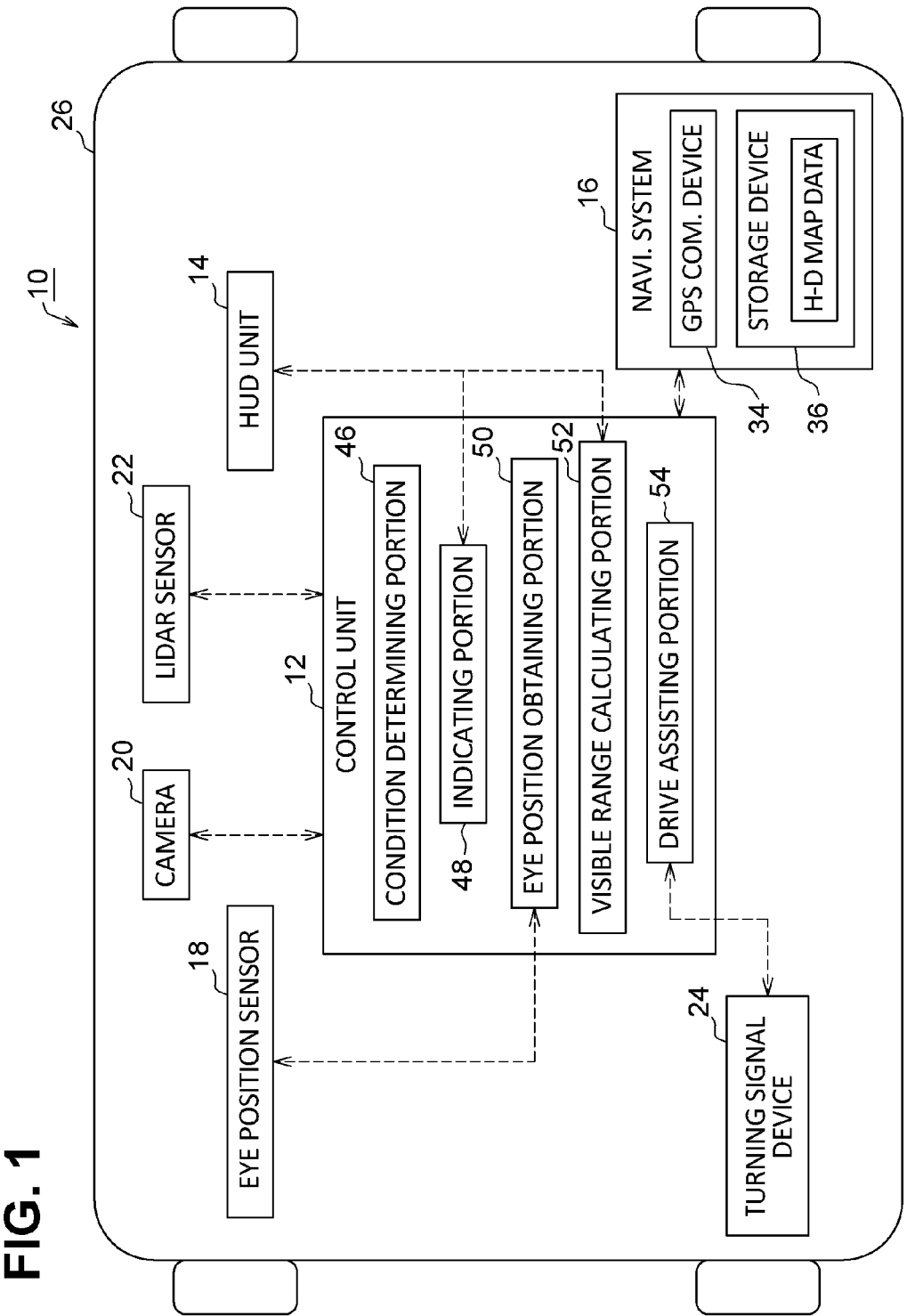
FIG. 1 is a block diagram of a system according to a first embodiment.

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

In the following embodiments, a driver visibility detection system is installed to a vehicle that can be configured as an automated vehicle which performs driving operations, such as changing lanes, and lane keeping, without input from a driver or with minimal input from the driver.

First Embodiment

The driver visibility detection system 10 and the method for detecting driver visibility according to the first embodiment will be described. FIG. 1 is a block diagram illustrating the driver visibility detection system 10 mounted to a vehicle 26. The driver visibility detection system 10 (hereinafter, referred to merely as a "system 10") generally includes a control unit 12. The system 10 in the present embodiment also includes a head-up display unit 14 (hereinafter, a "HUD unit 14"), a navigation system 16, an eye position sensor 18, a camera 20, a LIDAR sensor 22, and a turning signal device 24. The control unit 12 is connected to other components of the system 10 through Ethernet (not illustrated) or any other suitable measures.

The camera 20, which serves as a passive vision sensor in the present embodiment, is an imaging device such as a high-speed camera, and is positioned at the front side of the vehicle 26. The camera 20 detects objects 28, 30, 32 such as surrounding vehicles 28, 32, pedestrians, road sings 30, and other obstacles, in a scene in front of the vehicle 26 by capturing images of these objects 28, 30, 32. The camera 20 also calculates the distances to the objects 28, 30, 32 based on the image data. The data (i.e., the distances to the objects) obtained by the camera 20 is output to the control unit 12.

The LIDAR sensor 22 (Light Detection And Ranging), which serves as a positive vision sensor in the present embodiment, is a sensor that detects objects 28, 30, 32 such as surrounding vehicles 28, 32, pedestrians, road signs 30, and other obstacles, in a scene in front of the vehicle 26 by illuminating the objects 28, 30, 32 with a laser light. The LIDAR sensor 22 is positioned at the front side of the vehicle 26 and calculates the distances to the objects 28, 30, 32. The data (i.e., the distances to the objects 28, 30, 32) obtained by the LIDAR sensor 22 is output to the control unit 12.

The navigation system 16 is a global positioning system (GPS) navigation system, and includes a GPS communication device 34 and a storage device 36. The GPS communication device 34 communicates with a GPS satellites (not illustrated) to obtain the position of the vehicle 26. The storage device 36 stores high-definition map data (i.e., 3D map data) including road data, road signs, buildings, and other location related data.

The eye position sensor 18 is an imaging device. The eye position sensor 18 is disposed in a passenger compartment of the vehicle 26 to face toward the driver. The eye position sensor 18 detects eyes of the driver, and identifies the position of the driver's eyes. The data obtained by the eye position sensor 18 (i.e., the eye position) is output to the control unit 12. As described later, the data obtained by the eye position sensor 18 during a visible range confirmation mode is used to calculate a visible range of the driver.

The HUD unit 14 is a display unit that displays images, such as navigation information, traffic information, and so on, on a windshield 38 (see FIG. 3), or on a combiner mounted on the windshield 38, to the driver. The HUD unit 14 is controlled by the control unit 12. In the present embodiment, the HUD unit 14 further displays an image message 40, lane marking images 42, and a highlighting image (contour 44) on the windshield 38, as will be described below.

The turning signal device 24 is a device that activates turn signals disposed on both sides of the vehicle 26 before and when the vehicle 26 turns right/left or changes lanes. The turning signal device 24 can be controlled by the driver when the driver operates the turning signal device 24. The turning signal device 24 can be also controlled by the control unit 12 when the vehicle 26 is partially or fully automated.

The control unit 12 is, for example, an electronic control unit (ECU), and is generally formed of a microprocessor, a ROM, a RAM, and so on. The control unit 12 is configured to control operation of the vehicle 26 based on control programs stored in the ROM. More specifically, the control unit 12 includes a condition determining portion (condition determiner) 46, an indicating portion (indicator) 48, an eye position obtaining portion (eye position obtainer) 50, a visible range calculating portion (visible range calculator) 52, and a drive assisting portion (drive assisting controller) 54. The condition determining portion 46 is configured to determine whether a low visibility situation occurs. The low visibility situation can be defined as a situation where the visibility of the driver in a scene in front of the vehicle 26 is reduced due to weather conditions, such as a raining condition, a snowing condition, a foggy condition, a smoky condition, a backlight condition, or the like.

In the present embodiment, the condition determining portion 46 determines the low visibility situation based on data detected by the camera 20 and data detected by the LIDAR sensor 22. More specifically, the condition determining portion 46 compares the distance to a furthest object (e.g., a preceding vehicle 28) among objects 28, 30 detected by the camera 20 and the distance to a furthest object (e.g., a preceding vehicle 32) among objects 28, 30, 32 detected by the LIDAR sensor 22. Hereinafter, the furthest object detected by the camera 20 is referred to as a "first furthest object 28" and the furthest object detected by the LIDAR sensor 22 is referred to as a "second furthest object 32".

The condition determining portion 46 determines that the low visibility situation occurs when the second distance is longer than the first distance by a first threshold distance or more. This means that if the low visibility situation such as a heavy raining condition or a heavy foggy condition occurs, the sensible range by the camera 20 would be reduced as with the driver's visible range. This is because, typically, the distance between the vehicle 26 and a furthest object that the camera 20 can detect during the low visibility situation would be shorter than the distance between the vehicle 26 and a furthest object that the camera 20 can detect during a normal visibility condition. On the other hand, the low visibility situation does not substantially affect the sensible range by the LIDAR sensor 22. Therefore, the difference between the sensible range of the camera 20 and the sensible range of the LIDAR sensor 22 substantially increases when the low visibility situation occurs. In contrast, the difference between the sensible range of the camera 20 and the sensible range of the LIDAR sensor 22 falls within a certain value when the visibility is normal. In view of the above, the condition determining portion 46 determines occurrence of the low visibility situation when the difference between the second distance and the first distance is greater than the first threshold.

Figure 3:
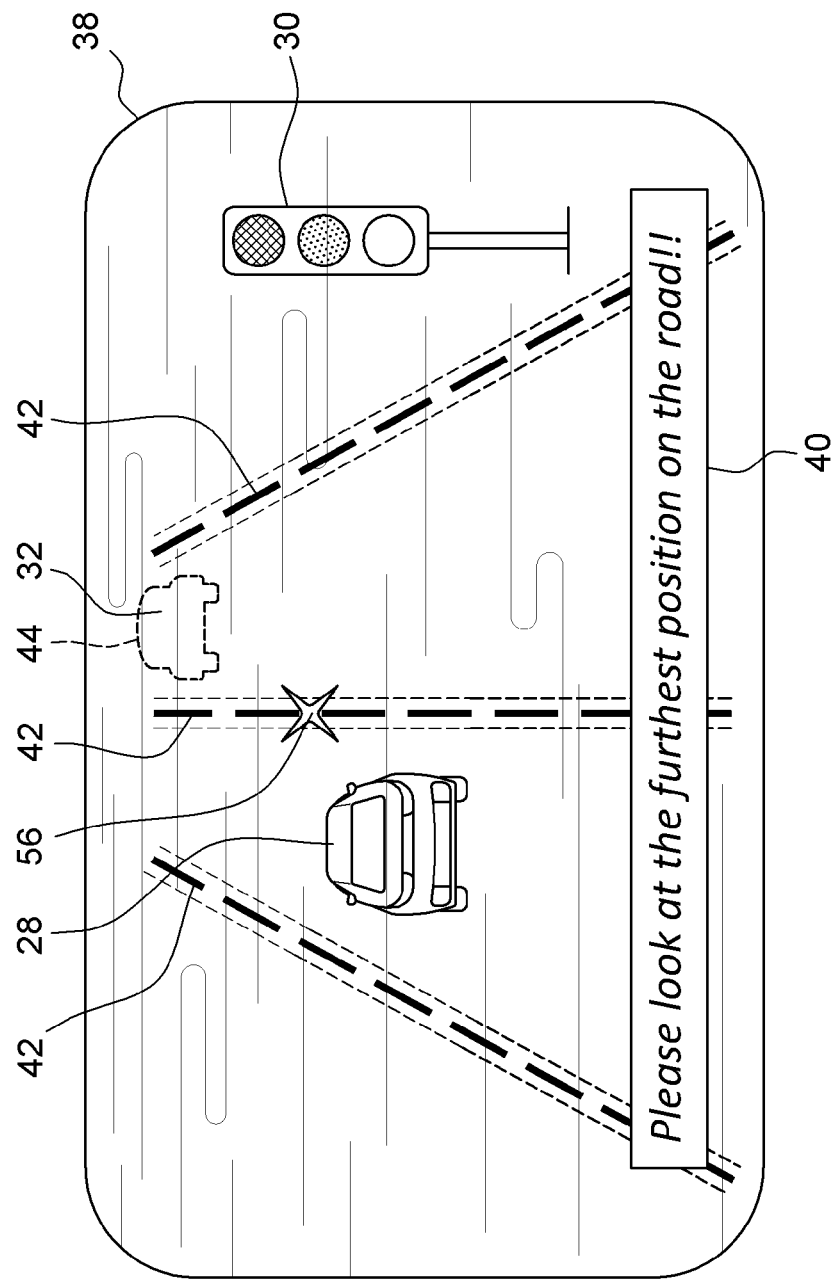
FIG. 3 is a driver's view of a scene in front of a vehicle through a windshield.

The indicating portion 48 executes the visible range confirmation mode when the condition determining portion 46 determines that the low visibility situation occurs. During the visible range confirmation mode, the driver is requested to look at a furthest ground position on the road on which the vehicle 26 is currently traveling. More specifically, the indicating portion 48 controls the HUD unit 14 to display, on the windshield 38, the message image 40 requesting the driver to look at a furthest position on the road as shown in FIG. 3. Furthermore, the indicating portion 48 controls the HUD unit 14 to display the lane marking images 42 on the windshield 38 during the visible range confirmation mode. The lane marking images 42 are virtual lane makings projected on the windshield 38. The HUD unit 14 displays the virtual lane images 42 to extend along actual lane markings (e.g., white lines) of the road on which the vehicle 26 is traveling.

The eye position obtaining portion 50 controls the eye position sensor 18 to detect the eye position of the driver during the visible range confirmation mode. The eye position obtaining portion 50 calculates the position (hereinafter, referred to as a "projected eye position 56" (see FIG. 3)) on the windshield 38 through which the line of drive's sight passes when the driver looks at the furthest ground position on the road. The projected eye position 56 calculated by the eye position obtaining portion 50 is output to the visible range calculating portion 52.

The visible range calculating portion 52 calculates the visible range of the driver based on the eye position of the driver when the driver looks at the furthest ground position on the road. More specifically, the visible range calculating portion 52 calculates the visible range based on the projected eye position 56 using the triangle proportionality theorem. The visible range calculated by the visible range calculating portion 52 is output to the drive assisting portion 54.

Furthermore, in the present embodiment, the visible range calculating portion 52 regards the first distance to the first furthest object 28 detected by the camera 20 as the visible range of the driver when the driver does not follow the request during the visible range confirmation mode. The first distance regarded as a visible range is output to the drive assisting portion 54 from the visible range calculating portion 52.

The drive assisting portion 54 is configured to control operation of the vehicle 26 by operating various components of the vehicle 26. In the present embodiment, the drive assisting portion 54 executes a normal control and a safety control depending on the visibility conditions. The normal control is executed when the condition determining portion 46 determines that the low visibility situation does not occur or when the visible range of the driver is equal to or greater than a threshold visible range. Under the normal control, the drive assisting portion 54 controls operation of the vehicle 26 assuming the visibility condition is normal. For example, the drive assisting portion 54 controls the turning signal device 24 to turn on, e.g., five seconds before the vehicle 26 changes lanes under the normal control.

On the other hand, the safety control is executed when the condition determining portion 46 determines that the low visibility situation occurs and when the visible range of the driver is less than the threshold visible range. For example, under the safety control, the drive assisting portion 54 controls the turning signal device 24 to turn on earlier than the normal control when changing lanes. Specifically, the drive assisting portion 54 controls the turning signal to turn on at least 7 seconds before the vehicle 26 changes lanes. Furthermore, the drive assisting portion 54 visually supports the driver during the safety control by highlighting invisible objects. The invisible objects 32 can be defined as objects that are detected by the LIDAR sensor 22 but not detected by the camera 20 (for example, the preceding vehicle 32 in FIG. 3). In other words, the invisible vehicle 32 can be an object that is not sensed by the driver. For example, the drive assisting portion 54 controls the HUD unit 14 to display the contour 44 of each invisible object 32 on the windshield 38. In addition, the drive assisting portion 54 may control the vehicle 26 to have a longer safety distance to a preceding vehicle 28 during the safety control.

Figure 2:
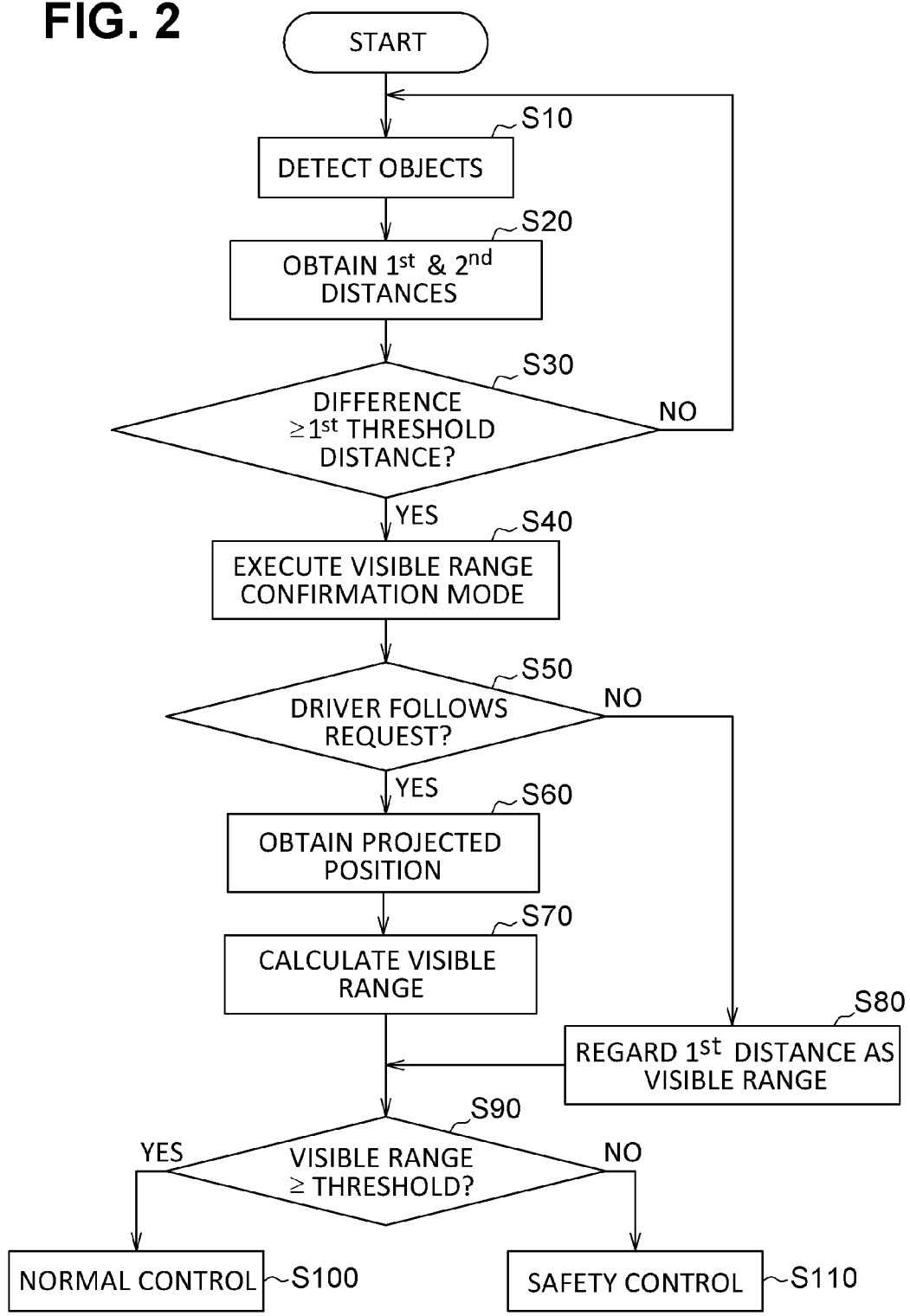
FIG. 2 is a flowchart executed by a control unit according to the first embodiment.

Next, the operation of the system 10 according to the present embodiment will be described below with reference to FIG. 2. The control unit 12 repeatedly performs operations as shown in the flowchart of FIG. 2 to control the system 10.

The camera 20 and the LIDAR sensor 22 detect objects 28, 30 in a scene in front of the vehicle 26 during traveling at Step 10. When the camera 20 detects objects 28, 30, the camera 20 calculates the distance to each of the objects 28, 30. Similarly, when the LIDAR detects objects 28, 30, 32, the LIDAR sensor 22 calculates the distance to each of the objects 28, 30, 32. The condition determining portion 46 obtains the first distance from the camera 20 and the second distance from the LIDAR sensor 22 at Step 20. That is, the conditioning determining portion obtains the distance to the furthest object detected by the camera 20 (i.e., the first furthest object 28 as shown in FIG. 3) as the first distance. The condition determining portion 46 obtains the distance to the furthest object detected by the LIDAR sensor 22 (i.e., the second furthest object 32 as shown in FIG. 3) as the second distance.

Then, the condition determining portion 46 determines whether the low visibility situation occurs by comparing the first distance with the second distance at Step 30. When the difference between the second distance and the first distance is less than the first threshold distance (Step 30: No), the condition determining portion 46 determines that the low visibility situation does not occur, then the process returns back to Step 10. On the other hand, when the difference between the second distance and the first distance is equal to or greater than the first threshold distance (Step 30: Yes), the condition determining portion 46 determines that the low visibility situation occurs and the process proceeds to Step 40.

At Step 40, the indicating portion 48 executes the visible range confirmation mode. That is, the indicating portion 48 controls the HUD unit 14 to display on the windshield 38 the message image 40 requesting the driver to look at a furthest ground position on the road on which the vehicle 26 is traveling. At the same time, the indicating portion 48 controls the HUD unit 14 to display the lane marking images 42 on the windshield 38.

If the driver follows the message image 40 and looks at a furthest ground position on the road (Step 50: Yes), the eye position obtaining portion 50 obtains the projected eye position 56 on the windshield 38 based on the eye position detected by the eye position sensor 18 (Step 60). Then, the visible range calculating portion 52 calculates the visible range of the driver based on the projected eye position 56 at Step 70.

On the contrary, when the driver does not follow the message image and does not look at a furthest ground position on the road (Step 50: No), the visible range calculating portion 52 regards the first distance obtained at Step 20 as the visible range of the driver at Step 80.

When the visible range of the driver obtained at Step 70 or Step 80 is equal to or greater than the threshold visible range (Step 90: Yes), the drive assisting portion 54 operates the vehicle 26 under the normal control at Step 100. On the other hand, when the visible range of the driver is less than the threshold visible range (Step 90: No), the drive assisting portion 56 operates the vehicle 26 under the safety control at Step 110.

Under the safety control, the drive assisting portion 54 more carefully operates the vehicle 26 than the normal control. For example, when the vehicle 26 plans to change lanes, the drive assisting portion 54 operates the turning signal device 24 to turn on earlier than the normal control. Furthermore, when there are invisible objects, such as the preceding vehicle 32, that are detected by the LIDAR sensor 22 but not detected by the camera 20 during the safety control, the drive assisting portion 54 controls the HUD unit 14 to display the contour 44 of the invisible object 32 to draw the driver's attention to the invisible object 32.

As described above, the system 10 requests the driver to look at a furthest ground position on the road, and obtains the eye position of the driver when the driver looks at the furthest ground position. Based on the eye position detected, the system 10 calculates the visible range of the driver. Accordingly, the system 10 can accurately obtain the visible range of the driver. Further, the system 10 executes the visible range confirmation mode only when the low visibility situation occurs. Thus, it is possible to avoid unnecessarily executing the visible range confirmation mode even when the visible condition is normal.

The low visibility situation is determined using the difference between the first distance detected by the camera 20 and the second distance detected by the LIDAR sensor 22. Therefore, the system 10 can accurately determine occurrence of the low visibility situation. During the visible range confirmation mode, the HUD unit 14 displays the lane marking image 42 on the windshield 38. Therefore, the driver can easily identify the road, which may lead to obtaining of the accurate furthest position on the road.

When the visible range calculated is less than the threshold visible range, the system 10 operates the vehicle 26 under the safety control. Therefore, the vehicle 26 can safely travel even when the visible range is reduced due to weather conditions such as a foggy condition, a smoky condition, a hard raining or snowing condition. Especially, during the safety control, the system 10 operates the turning signal device 24 to turn on earlier than the normal control. Hence, the vehicle 26 can safely change lanes. Furthermore, the HUD unit 14 highlights the invisible object 32 that is only detected by the LIDAR sensor 22, the driver can draw attention to the invisible object 32.

Second Embodiment

Next, the driver visibility detection system 10 and the method for detecting driver visibility according to the second embodiment will be described. In the first embodiment, the system 10 includes the camera 20 and the LIDAR sensor 22, and determines the low visibility situation based on the difference between the first distance and the second distance. In the present embodiment, the vehicle 26 has only the camera 20 and the LIDAR sensor 22 or another positive vision sensor is not mounted to the vehicle 26. The condition determining portion 46 of the present embodiment determines whether the low visibility situation occurs based on data detected by the camera 20 and the high-definition data stored in the storage device 36.

In the present embodiment, an initial detection distance is defined as a distance to a road object (particular object), such as a road sign 30, that is detected by the camera 20 at a first recognition timing. The first recognition timing is a timing when the camera 20 detects the road object 30 at first. Then, the system 10 calculates the initial detection distance by obtaining the distance from the vehicle 26 to the road object 30 using the high-definition data. That is, the system 10 obtains the initial detection distance comparing the position of the vehicle 26 at the first recognition timing obtained by the GPS communication device 34 and the position of the road object 30 at the first recognition timing obtained from the high-definition data.

The condition determining portion 46 determines that the low visibility situation occurs when the initial detection distance is shorter than a second threshold distance. In other words, when the visible range is reduced, the camera 20 cannot detect an object 30 until the vehicle 26 reaches a closer position to the object 30 as compared to a normal visibility condition. If the condition determining portion 46 determines that the low visibility situation occurs, the control unit 12 performs Steps 40 to 110 of FIG. 2 as described in the first embodiment.

In this way, even when the vehicle 26 has no LIDAR sensor 22, the system 10 according to the second embodiment can detect occurrence of the low visibility situation.

Other Embodiments

In the above-described embodiment, the indicating portion 48 controls the HUD UNIT 14 to display the message image 40 on the windshield 38 during the visible range confirmation mode. In place of, or in addition to, displaying the message image 40, the indicating portion 48 may control a sound system mounted to the vehicle 26 to sound a voice message requesting the driver to look at a furthest position on the road.

In the second embodiment, the condition determining portion 46 calculates the initial detection distance using the high-definition data. Alternatively, the initial detection distance may be calculated based on data detected by the LIDAR sensor 22 if the vehicle 26 is equipped with the LIDAR sensor 22. More specifically, the initial detection distance can be obtained from data of the particular object 30 detected by the LIDAR sensor 22 at the initial recognition timing.

In the above-described embodiments, the LIDAR sensor 22 is used as the positive vision sensor. However, other sensors, such as a radar sensor, an infrared sensor, may be used as the positive vision sensor.

In the above described embodiments, the system 10 includes the drive assisting portion 54, and when the visible range calculated by the visible range calculating portion 52 is less than the threshold visible range, the drive assisting portion 54 controls the vehicle 26 under the safety control. Alternatively, in a case where the vehicle 26 has no automation function (i.e., the system 10 has no drive assisting portion 54), the system 10 may indicate such a low visible range to the driver. For example, when the visible range calculated by the visible range calculating portion 52 is less than the threshold visible range, the system 10 may control the HUD unit 14 to display warning messages to inform the driver of the low visible range.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A driver visibility detection system for a vehicle, the system comprising:
    an indicator that requires the driver to look at, through a windshield of the vehicle, a furthest ground position of a road on which the vehicle is traveling;
    an eye position obtainer that recognizes an eye position of the driver when the driver looks at the furthest ground position; and
    a visible range calculator that calculates a visible range of the driver based on the eye position detected by the eye position obtainer.

2. The driver visibility detection system according to claim 1, further comprising a condition determiner that determines whether a low visibility situation occurs in a scene in front of the vehicle, wherein the indicator is configured to indicate the driver to look at the furthest ground position when the condition determiner determines that the low visibility situation occurs.

3. The driver visibility detection system according to claim 2, further comprising:

a passive vision sensor that detects objects in front of the vehicle; and a positive vision sensor that detects objects in front of the vehicle, wherein a first distance is defined as a distance to a furthest object among the objects detected by the passive vision sensor, a second distance is defined as a distance to a furthest object among the objects detected by the positive vision sensor, and the condition determiner determines that the low visibility situation occurs when the second distance is longer than the first distance by a first threshold distance or more.

4. The driver visibility detection system according to claim 2, further comprising a passive vision sensor that detects objects in front of the vehicle, wherein an initial detection distance is defined as a distance to a particular object among the objects at a first recognition timing when the passive vision sensor detects the particular object at first, and the condition determiner determines that the low visibility situation occurs when the initial detection distance is shorter than a second threshold distance.

5. The driver visibility detection system according to claim 4, wherein the particular object is a road object, and the initial detection distance is calculated using map data of the road object.

6. The driver visibility detection system according to claim 4, further comprising a positive vision sensor that detects objects including the particular object in front of the vehicle, wherein the initial detection distance is calculated using data of the particular object obtained by the positive vision sensor at the first recognition timing.

7. The driver visibility detection system according to claim 1, wherein the indicator controls a head-up display unit mounted to the vehicle to display, on the windshield, an message image requesting the driver to look at the furthest ground position.

8. The driver visibility detection system according to claim 7, wherein the indicator further controls the head-up display unit to display a lane marking image along the road on the windshield together with the message image.

9. The driver visibility detection system according to claim 1, further comprising a drive assisting controller that controls operation of the vehicle, wherein the drive assisting controller executes safety control when the visible range calculated by the visible range calculator is less than a threshold visible range.

10. The driver visibility detection system according to claim 9, wherein the drive assisting controller controls a turning signal device mounted to the vehicle to turn on before the vehicle changes lanes, and the drive assisting controller controls the turning signal device to turn on during the safety control earlier than a normal control other than the safety control.

11. The driver visibility detection system according to claim 9, further comprising a passive vision sensor that detects objects in front of the vehicle, wherein the drive assisting controller regards a distance to a furthest object among the objects detected by the passive vision sensor as the visible range when the driver does not look at the furthest ground position.

12. The driver visibility detection system according to claim 1, further comprising:

a passive vision sensor that detects objects in front of the vehicle; and a positive vision sensor that detects objects in front of the vehicle, wherein the drive assisting controller controls a head-up display unit mounted to the vehicle to highlight an invisible object that is detected by the positive vision sensor but not detected by the passive vision sensor by displaying a contour of the invisible object on the windshield.

13. A method for detecting driver visibility, the method comprising the step of:

requesting, by an indicator, a driver to look at, through a windshield of a vehicle, a furthest ground position of a road on which the vehicle is traveling;

obtaining, by an eye position obtainer, an eye position of the driver through an eye position sensor, when the driver looks at the furthest ground position; and calculating, by a visible range calculator, a visible range of the driver based on the eye position.

14. The method according to claim 13, further comprising the step of determining, by a condition determiner, whether a low visibility situation occurs in a scene in front of the vehicle, wherein the step of indicating is performed when the condition determiner determines that the low visibility situation occurs.

15. The method according to claim 14, further comprising the step of:

detecting, by a passive vision sensor, objects in front of the vehicle; and detecting, by a positive vision sensor, objects in front of the vehicle, wherein a first distance is defined as a distance to a furthest object among the objects detected by the passive vision sensor, a second distance is defined as a distance to a furthest object among the objects detected by the positive vision sensor, and the condition determiner determines that the low visibility situation occurs when the second distance is longer than the first distance by a first threshold distance or more.

16. The method according to claim 14, further comprising the step of detecting, by a passive vision sensor, objects in front of the vehicle, wherein an initial detection distance is defined as a distance to a particular object among the objects at a first recognition timing when the passive vision sensor detects the particular object at first, and the condition determiner determines that the low visibility situation occurs when the initial detection distance is shorter than a second threshold distance.

17. The method according to claim 16, wherein
the particular object is a road object, and
the initial detection distance is calculated using map data of the road object.

18. The method according to claim 16, further comprising the step of
detecting, by a positive vision sensor, objects including the particular object in front of the vehicle, wherein
the initial detection distance is calculated using data of the particular object obtained by the positive vision sensor at the first recognition timing.

19. The method according to claim 13, wherein
the step of indicating includes the step of displaying, on the windshield, an message image requesting the driver to look at the furthest ground position.

20. The method according to claim 19, wherein
the step of indicating further includes the step of displaying a lane marking image along the road on the windshield together with the message image.

21. The method according to claim 13, further comprising the step of
executing, by a drive assisting controller, safety control when the visible range calculated by the visible range calculator is less than a threshold visible range.

22. The method according to claim 21, wherein
the step of executing safety control includes the step of controlling a turning signal device mounted to the vehicle to turn on during the safety control earlier than a normal control other than the safety control.

23. The method according to claim 21, further comprising the step of
detecting, by a passive vision sensor, objects in front of the vehicle, wherein
the drive assisting controller regards a distance to a furthest object among the objects detected by the passive vision sensor as the visible range when the driver does not look at the furthest ground position.

24. The method according to claim 13, further comprising the step of:
detecting, by a passive vision sensor, objects in front of the vehicle;
detecting, by a positive vision sensor, objects in front of the vehicle; and
highlighting an invisible object that is detected by the positive vision sensor but not detected by the passive vision sensor by displaying a contour of the invisible object on the windshield.

* * * * *